(12) United States Patent  (10) Patent No.: US 7,620,215 B2
Parlin et al.  (45) Date of Patent: Nov. 17, 2009

(54) APPLYING LOCALIZED IMAGE EFFECTS OF VARYING INTENSITY

(75) Inventors: David R. Parlin, Redmond, WA (US); John M. Thornton, Kirkland, WA (US); Michael H. Kim, Issaquah, WA (US); Michael J. Gilmore, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 681 days.

(21) Appl. No.: 11/226,276

(22) Filed: Sep. 15, 2005

(65) Prior Publication Data

US 2007/0058882 A1 Mar. 15, 2007

(51) Int. Cl.
*G06K 9/00* (2006.01)
*G06K 9/40* (2006.01)

(52) U.S. Cl. ................................ 382/117; 382/275

(58) Field of Classification Search ............... 382/117, 382/167, 275; 358/518, 520
See application file for complete search history.

(56) References Cited

U.S. PATENT DOCUMENTS

| | | | |
|---|---|---|---|
| 6,009,209 A * | 12/1999 | Acker et al. | 382/275 |
| 6,285,410 B1 * | 9/2001 | Marni | 348/576 |
| 6,504,551 B1 * | 1/2003 | Takashima et al. | 345/649 |
| 6,873,743 B2 * | 3/2005 | Steinberg | 382/275 |
| 6,980,691 B2 * | 12/2005 | Nesterov et al. | 382/165 |
| 7,024,035 B1 * | 4/2006 | Enomoto | 382/167 |
| 7,324,246 B2 * | 1/2008 | Enomoto | 358/538 |
| 2004/0100486 A1 * | 5/2004 | Flamini et al. | 345/723 |
| 2004/0109614 A1 * | 6/2004 | Enomoto et al. | 382/275 |
| 2004/0141657 A1 * | 7/2004 | Jarman | 382/275 |
| 2004/0160517 A1 * | 8/2004 | Iida | 348/207.99 |
| 2005/0163498 A1 * | 7/2005 | Battles et al. | 396/158 |

OTHER PUBLICATIONS

Zhang, et al. "Automated red-eye detection and correction in digital photographs", IEEE, pp. 2363-2366, 2004.*

* cited by examiner

*Primary Examiner*—Daniel G Mariam
(74) *Attorney, Agent, or Firm*—Shook, Hardy & Bacon, LLP (57) ABSTRACT

A method for applying localized image effects to digital images is provided. The method includes receiving a selection representing a location in proximity to a region in the digital image requiring one or more correction. The region requiring correction is processed by an image processing engine to determine the boundaries of the region. The image processing engine applies one or more image effects to the region and varies an intensity level associated with each image effect according to the number clicks received at the location in proximity to the region requiring the correction.

19 Claims, 5 Drawing Sheets

APPLYING LOCALIZED IMAGE EFFECTS OF VARYING INTENSITY

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Currently, images having an area that captures a retina of an eye creates what is commonly referred to as the red-eye effect. The red-eye effect occurs when flash from an image capture device focuses on a pupil that did not adjust to the rapid change in lighting conditions caused by the flash. The red-eye effect occurs in the images because the flash bounces off of the retina and the image capture device processes the image of the retina as a red dot. The red-eye effect is a common defect because the red-eye effect normally occurs in dark conditions, when the flash of the image capture device is used.

Current techniques to remove red-eye from images are extremely complex and do not provide intuitive interfaces to remove the red-eye effect. Complex image capture devices provide automated mechanisms that prevent the red-eye effect. Image processing applications provide interfaces and controls that are utilized to remove the red-eye effect. The controls include sliders that adjust a radius of the area having the red-eye effect, a color of the area, or a brightness of the area. The controls and interfaces provided by the image processing application initiate complicated interactions that novice users may find difficult to understand. The novice user must manipulate the controls to an optimal setting that removes the red-eye effect without adversely impacting a quality associated with the digital image. Accordingly, a need arises for simplified systems that facilitate interactions to manipulate the digital images.

SUMMARY

In an embodiment, a method for applying localized image effects to digital images is provided. Requests generated by a user are utilized to determine where to apply an image effect, and an amount of the image effect. The amount of the image effect applied to the digital images may be inferred from the user's behavior, such as, e.g., request frequency or request position. After receiving an initial request for a region of a digital image, a predetermined amount of the image effect is applied to the region of the digital image. Subsequent requests adjust the predetermined amount of the image effect until a threshold number of requests is passed. After passing the threshold number of requests, subsequent requests do not adjust the predetermined amount of image effect. The image effect automatically and simultaneously adjusts various image properties associated with the region specified by the request. Accordingly, user requests may be utilized to modify regions of the digital image by applying the localized image effects.

This Summary is provided to introduce a selection of concepts in a simplified form that are further described below in the Detailed Description. This Summary is not intended to identify key features or essential features of the claimed subject matter, nor is it intended tot be used as an aid in determining the scope of the claimed subject matter.

DETAILED DESCRIPTION

Embodiments of the invention provide an image processing engine that may be utilized for any operation that is a variable operation, which should be applied to a location within a digital image based on the number of user requests near the location. The image processing engine detects the boundaries of an object that is near to the location specified by the user request. Upon detecting the boundaries of the object, the image processing engine applies a predetermined amount of the variable operation to the object. The image processing engine tracks the amount of the amount of the variable operation applied to the object and the location of the object. Subsequent requests to apply the variable operation to the object utilizes the information tracked by the image processing engine to determine the appropriate level of the variable operation to apply to the object. When a threshold number or requests is passed the image processing engine does not apply the variable operation to the object.

In an embodiment of the invention, a method for removal of red-eye effect from digital images is provided. Click requests generated by a user are utilized to determine where to apply a red-eye fix, a size of the red-eye fix and an amount of the red-eye fix. The amount of red-eye fix to apply may be inferred from the user's behavior, such as, click frequency or click position. After receiving an initial click request in a region of a digital image, a predetermined amount of the red-eye fix is applied to the digital image. Subsequent click requests adjust the predetermined amount of the red-eye fix up to a threshold number of clicks. After passing the threshold number of clicks, subsequent clicks do not increment the predetermined amount of red-eye fix. The red-eye fix automatically and simultaneously adjusts various image properties associated with the region specified by the clicks. Accordingly, the red-eye effect is removed from the digital image based on simple user interactions, such as, click requests.

Embodiments of the invention provide a red-eye removal system that utilizes simple interactions to remove red-eye from digital images. In an embodiment of the invention, the simple interactions includes click requests that specify a region in a digital image having red-eye. A red-eye fix is applied to the region to remove the red-eye from the selected region. A red-eye data structure is utilized to track the requests and the amount fix. Subsequent click requests adjust an amount of red-eye fix applied to the selected region. Accordingly, embodiments of the invention remove red-eye from regions of a digital image based on the number of clicks requests.

A system that applies variable image effects may include one or more computers that have processors that execute instructions associated with applying the variable image effects. The computers may include a multimedia database to store digital images. A collection of the digital images may include regions that have the one or more objects. The processors may include an image processing engine utilized to detect the objects in the images and to apply the image effects. In an alternate embodiment of the invention, the multimedia database may be communicatively connected to the computer through a communication network, and the computer may be a portable device, such as, laptops, personal digital assistants, smart phones, etc.

In an embodiment of the invention, the region may include objects, such as, an eye and a pupil of the eye having a red-eye effect. The system utilizes an image processing engine to remove the red-eye effect by applying a variable red-eye fix.

Figure 1:
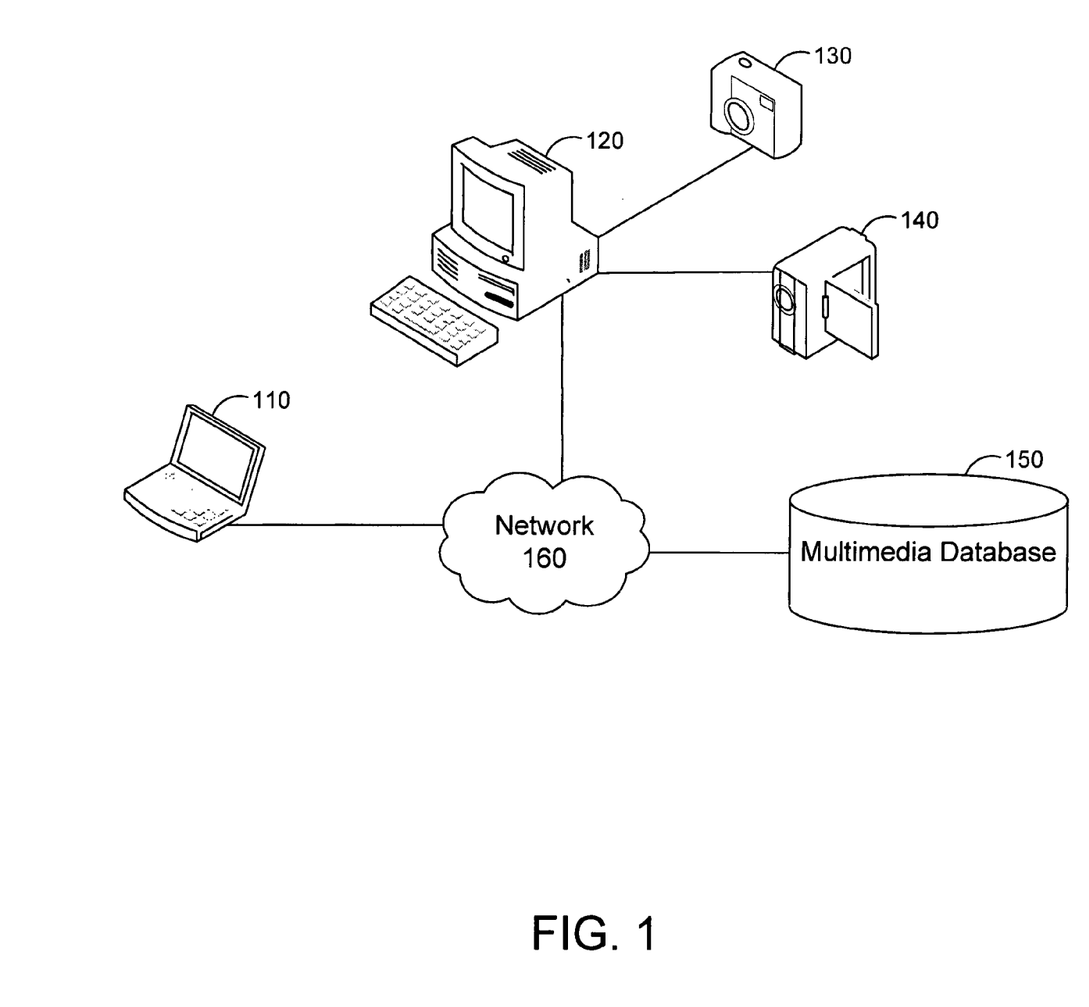
FIG. 1 illustrates a block diagram of an exemplary computing environment utilized by embodiments of the invention.

FIG. 1 illustrates a block diagram of an exemplary computing environment 100 utilized by embodiments of the invention. The computing environment 100 is not intended to suggest any limitation as to scope or functionality. Embodiments of the invention are operable with numerous other special purpose computing environments or configurations. With reference to FIG. 1, the computing environment 100 includes client computers 110-120, image capture devices 130-140, a multimedia database 150 and a communication network 160.

The client computers 110-120 each have processing units, coupled to a variety of input devices and computer-readable media via communication buses. The computer-readable media may include computer storage and communication media that are removable or non-removable and volatile or non-volatile. By way of example, and not limitation, computer storage media includes electronic storage devices, optical storages devices, magnetic storage devices, or any medium used to store information that can be accessed by client computers 110-120, and communication media may include wired and wireless media. The input devices may include, mice, keyboards, joysticks, controllers, microphones, cameras 130, camcorders 140, or any suitable device for providing user input to the client computers 110-120.

Additionally, the client computers 110-120 may store application programs that provide computer-readable instructions to implement various heuristics. In an embodiment of the invention, the client computers 110-120 store an image processing application that manipulates multimedia files. The multimedia files may be image or video files that are captured on the camera 130 or camcorder 140 and communicated directly to the client computers 110-120 to store the multimedia files in the multimedia database 150. The multimedia files created by camera 130 represent digital images that may include one or more regions having different objects. The image processing application may include one or more variable image effect functions that are capable of adjusting the one or more regions included in the digital images. The communication network 160 may be a local area network, a wide area network, or the Internet. The client computers 110-120 may include laptops, smart phones, personal digital assistants, and desktop computers, and the camera 130 may include a digital camera. The computing environment illustrated in FIG. 1 is exemplary and other configurations are within the scope of the invention.

The variable image effect functions may include red-eye removal functions. The image processing application may utilize the variable image effect functions to process the digital images. Furthermore, the image processing application may utilize a monitoring component to track requests received from an input device, an image processing engine to execute the variable image effect functions based on the requests, and a multimedia database. The multimedia database provides access to digital images that includes one or more regions. In an embodiment of the invention, the digital images may be stored on suitable storage mediums, including memory cards, compact disks, or hard drives. The image processing engine retrieves the digital images that have the one or more regions from the multimedia database and manipulates the digital images to adjust the appearance of the digital image. The manipulations associated with the multimedia database includes adjusting a combination of different characteristics associated with the one or more region. The characteristics are automatically varied by predetermined amounts based on the number of click requests received by the image processing engine. In an embodiment of the invention, the characteristics include brightness, color, radius, location, saturation, or intensity. Furthermore, the one or more regions may include red-eye regions, and the adjustments may reduce or remove the red-eye regions Accordingly, embodiments of the invention provide an image processing application that applies variable image effects, such as, red-eye fix, based on requests received from an input device, such as a pointer, mouse, controller or any suitable selection device.

Figure 2:
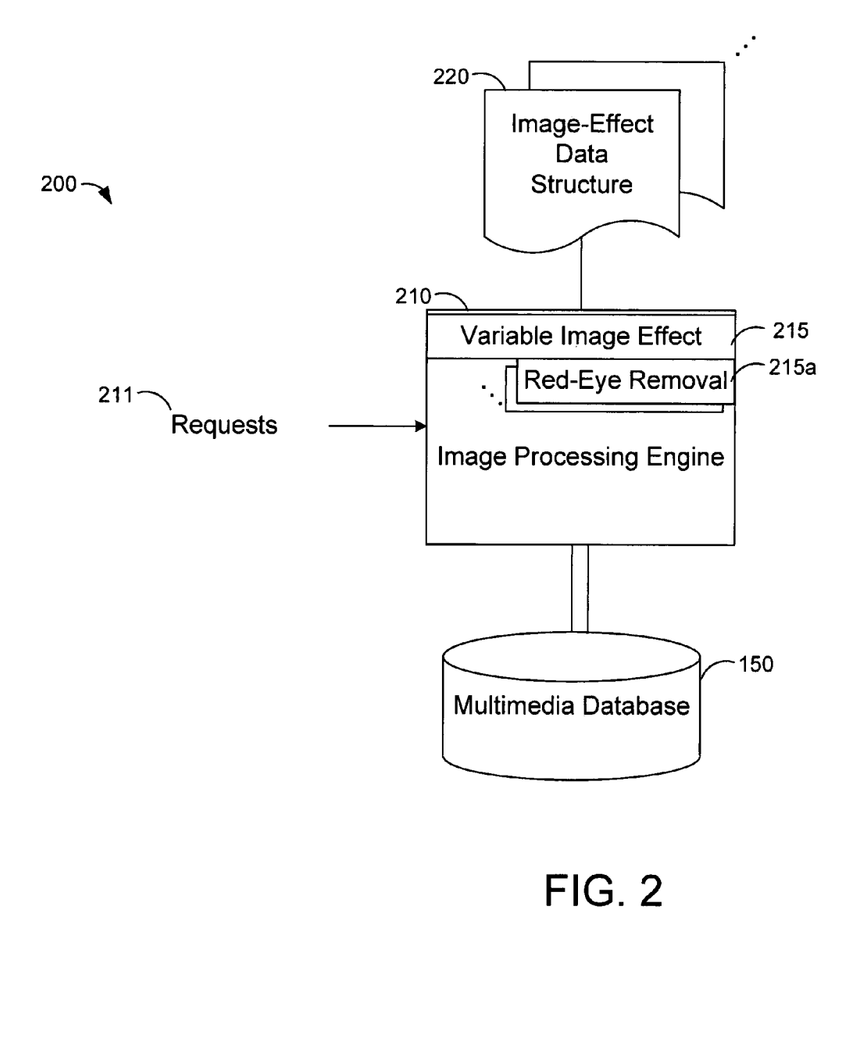
FIG. 2 illustrates a variable image effect system utilized by embodiments of the invention.

FIG. 2 illustrates a variable image effect system 200 utilized by embodiments of the invention. The variable image effect system 200 includes a multimedia database 150, an image processing engine 210, and an image-effect data structure 220. The image processing engine 210 communicates with the multimedia database 150 to obtain digital images that have regions, such as, red-eye regions. A user may utilize an input device to click on the regions included in the digital images, and the input device generates a request 211. Clicking on a region may initiate a variable image effect function 215 included in image processing engine 210. The variable image effect functions 215 may apply a pre-determined level of a variable image effect to the region. In an embodiment of the invention, the variable image effect function is a red-eye removal function 215a, and the red-eye removal 215a function applies a pre-determined level of a red-eye fix to the region.

The image-effect data structure 220 tracks the requests 211 and stores information about the location of the region clicked on by the user. The image-effect data structure 220 stores the level of the effect applied to the region and the number of requests received. Also, the image-effect data structure 220 associated with the digital image stores tracking information for each region included in the digital image. Moreover, each digital image having one or more regions may be associated with a different image-effect structure 220.

In an embodiment of the invention, the image-effect data structures 220 are red-eye data structures that track the level of the red-eye fix applied to red-eye regions of the digital image. The red-eye data structure tracks the location and level of fix for each red-eye regions individually. However, in an alternate embodiment, the red-eye data structure may reference pairs of red-eye regions in the digital image. The red-eye fix for a selected red-eye region of the pair is applied uniformly across the pair of red-eye regions. Subsequent request for either region of the pair of red-eye regions increase the red-eye fix for each red-eye region in the pair.

Accordingly, the image processing engine 210 utilizes the image-effect data structure 220 to vary the image effect applied to the digital image for each subsequent request received from the input device. When a maximum number of requests is reached, the subsequent requests do not affect the level of the image effect, red-eye fix, applied to the digital image. Additionally, the requests may apply the image effect, red-eye fix, individually to a region, or to a pair of regions. In an embodiment of the invention, the requests are click requests.

The image processing application may provide a graphical user interface to display the digital images included in the multimedia database. The graphical user interface includes operations that may be applied to files stored in the multimedia database. The operations include variable image effects that adjust the appearance of the digital images. The operations also include variable fix operations that enable a user to correct errors in the files stored in the multimedia database.

Figure 3:
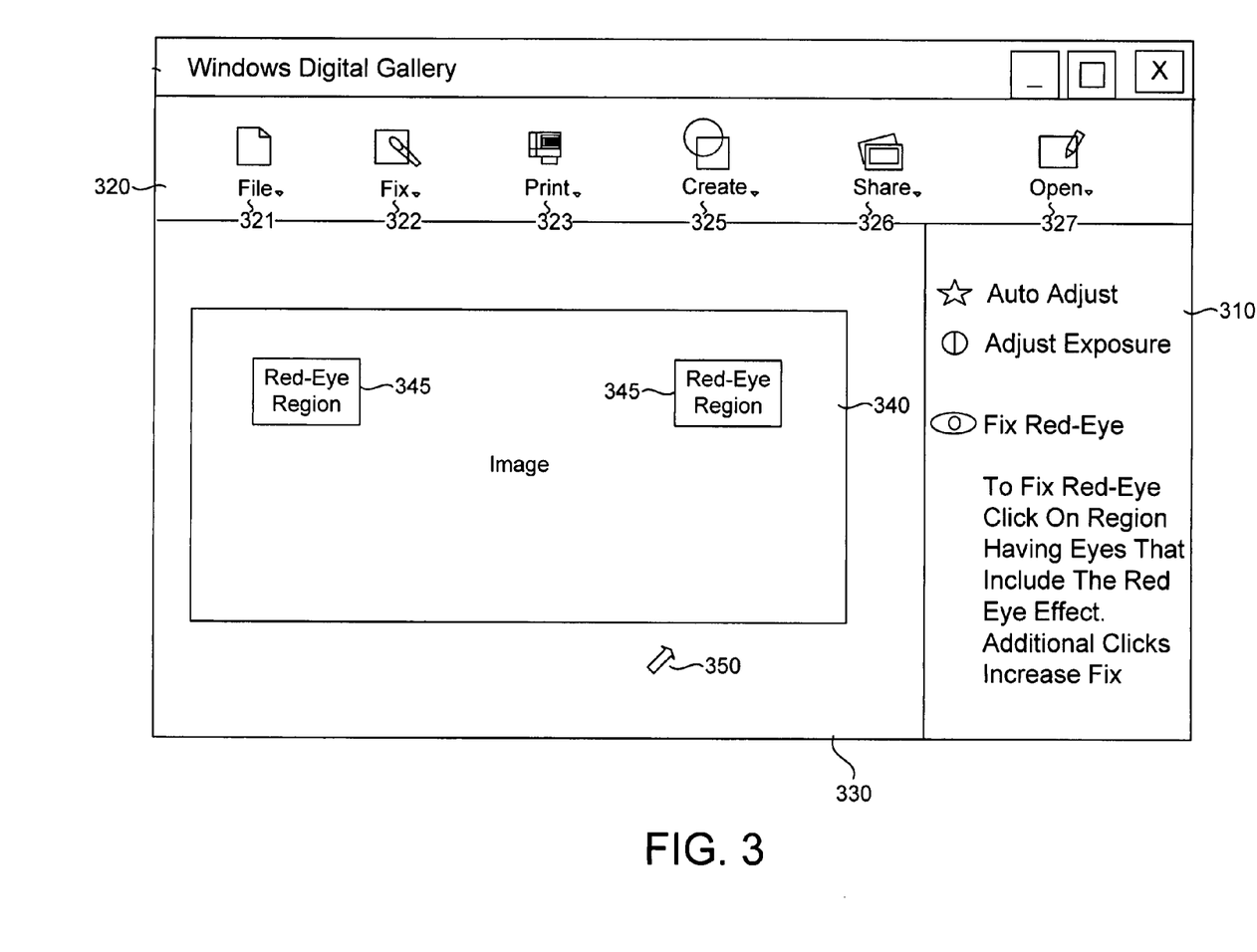
FIG. 3 illustrates a graphical user interface for the variable image effect system utilized by embodiments of the invention.

FIG. 3 illustrates a graphical user interface 300 for the variable image effect system utilized by embodiments of the invention. The graphical user interface 300 may provide access to digital libraries storing multimedia files. The graphical user interface 300 includes a details section 310, a file operations section 320 and a view section 330.

The file operations section 320 provides a toolbar having various multimedia file operations. The operations include, among other things, file 321, fix 322, print 323, create 325, share 326, or open 327. The fix operation 322 allows the user to edit a selected multimedia file. The fix operations 322 may include a variable red-eye fix operation that allows a user to reduce or remove red-eye regions 345 in a digital image 340.

The details section 310 provides information about the fix being applied to the digital image 340. The details section 310 may provide information to a user describing how to interact with the graphical user interface to initiate the operations, such as, the variable red-eye fix.

The view section 330 provides a display area to view the multimedia files, including the digital image 340. The view section 330 may display the digital image 340 and one or more red-eye regions 345 associated with the digital image 340. A cursor 350 may be navigated around the graphical user interface 300 to click on the red-eye regions. The user may zoom in on the different red-eye regions 345 associated with the digital image 340. In an alternate embodiment of the invention, the cursor 350 becomes cross hairs when placed over the digital image 340 and the red-eye fix operation is enabled. When the cursor is not over the digital image a regular cursor 350 is displayed. The user positions the cross hairs over the red-eye regions 345 and clicks to apply the fix to each red-eye independently. Each click that adjusts the intensity associated with the red-eye fix is an undoable action. Moreover, the digital image may include one or more object that require a variable operation. The user may generate a request to select the object and to apply the variable operations to the object. A predetermined level associated with the operation is applied to the object, and subsequent requests less then a specified threshold number of requests, which specify the object receive incremental increases in the intensity of the operation.

Accordingly, the graphical user interface 300 provides simple user interactions that apply variable image effects to the digital images. In an embodiment of the invention, the image effects applied may reduce or remove the red-eye effect in the digital images. When the user clicks on a red-eye region 345 in the digital image 340, the red in the red-eye region 345 is reduced or removed. If the user is not satisfied with the red-eye fix, subsequent clicks on the same red-eye region 345 adjusts the intensity of the red-eye fix applied to the red-eye region 345. In an embodiment of the invention, all adjustments increase the intensity of the red-eye fix.

In an embodiment of the invention, applying image effects to the digital images may include object detection, determining where to apply the effect, and object correction. When the image effect is a red-eye fix and the object is an eye, a red-eye fix may remove red from the detected eye to create a "natural" looking eye.

Object detection is accomplished when the user informs the image processing engine where the region of interest is located by clicking on the digital image near the regions to generate a request. In an embodiment of the invention, the regions may have red-eye effect. After the image processing engine receives the location the user wants to adjust, the image processing engine creates a layer and generates coordinates for the layer of the location associated with the requests to initiate object detection. The image processing engine utilizes the layer to detect the boundaries of the object and the size of the object. In an embodiment of the invention, when the object is an eye having the red-eye effect, the image processing engine utilizes the layer to look for a red area at the user coordinates. The red area detection may use a color model, such as Red-Green-Blue (RGB) or any appropriate color model to determine the color of the specified area. In an embodiment of the invention, the image processing engine detects circular or elliptical red areas. The image processing engine scans for neighboring red pixels in the layer associated with the user click to detect the circular or elliptical red areas. The image processing determines the size of the red area and stores it the image-effect, red-eye, data structure. If the scan does not detect circular or elliptical red areas where the user clicked, a report is generated and returned to the image processing engine.

Figure 4:
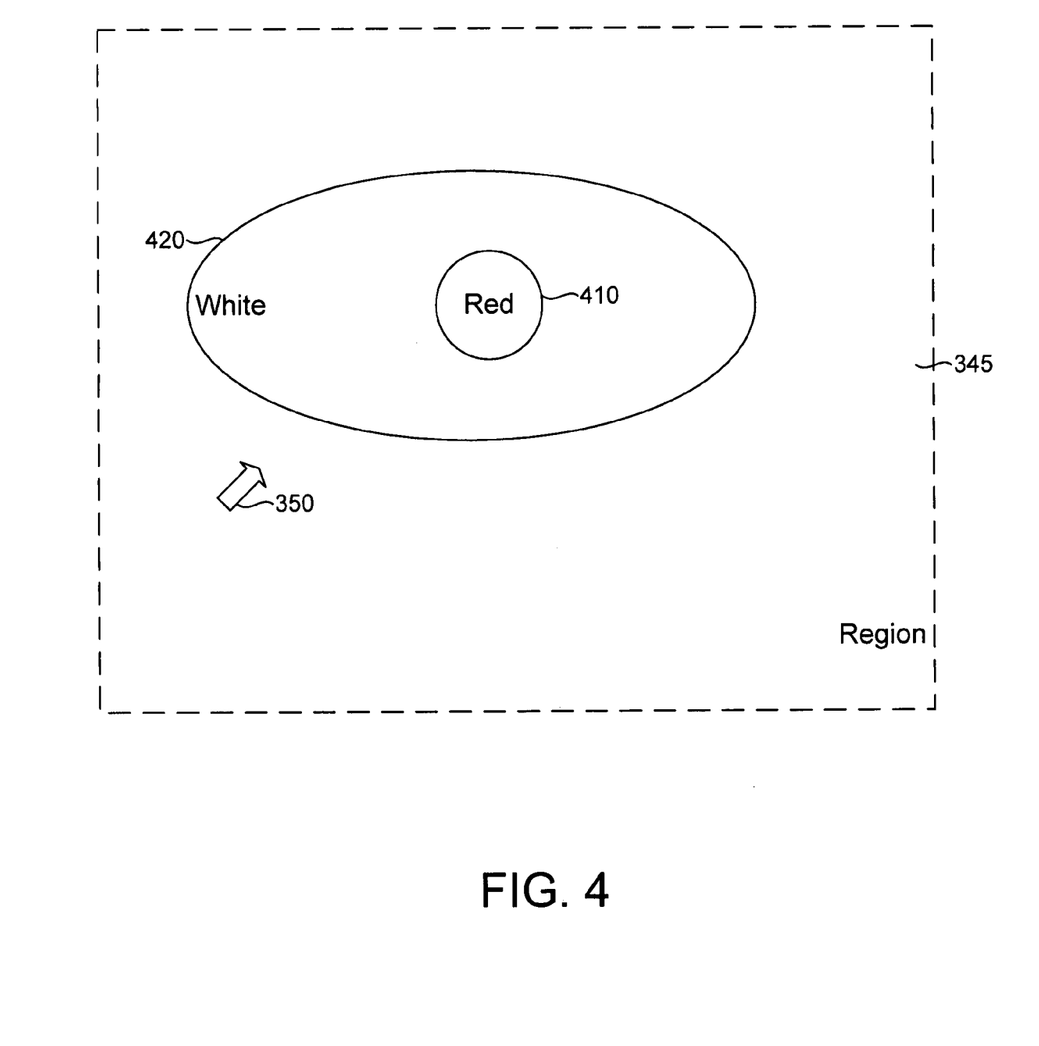
FIG. 4 illustrates a red-eye region of a digital image utilized by embodiments of the invention.

FIG. 4 illustrates a red-eye region 345 of a digital image utilized by embodiments of the invention. The user may utilize the cursor 350 to click on the red-eye region 345. The red-eye region 345 includes a white area 420 and a red area 410. The image processing engine utilizes the click information to generate coordinates to scan for eye detection. The coordinates may generate a rectangular layer that includes the boundaries of the eye. The image processing engine scans the layer to detect the red area 410. The image processing engine may utilize the scan to detect the size of the red area 410. The image processing engine stores the coordinate and size information in the red-eye data structure along with the level of red-eye fix applied, when the red area 410 is detected.

Accordingly, the image processing engine receives the click requests to generate coordinates to locate the red area 410 in the red-eye region 345 and to calculate the size of the red area 410 in the red-eye region 345.

After locating the object and calculating the size of the object, the image processing engine attempts to apply the image effect to the detected object. The image-effect data structure stores information about the location of the object and the level of the image effect currently applied to the object. Subsequent requests to increase the image effect associated with the object utilizes the information stored in the image-effect data structure to determine the appropriate level of image effect to apply to the object. In an embodiment of the invention, the image effect is a fix, such as red-eye fix. An intensity associated with the fix will start at a predetermined level. In an embodiment of the invention, the intensity is set to 80% of the maximum intensity. Each digital image includes a image-effect, red-eye, data structure to track the intensity of the red-eye fix applied according to the number of clicks received in the red-eye region. After the red-eye fix is applied to the digital image and a subsequent click is received, the coordinates of the subsequent click are compared against the list of eyes, which are currently being fixed in the digital image and stored in the red-eye data structure. If the user coordinates fall inside the radius of any of the existing fixes stored in the red-eye data structure, the intensity for the eye within the radius is adjusted. Otherwise, a new fix is created and the red-eye data structure is updated to include the information for the red-eye region. In an embodiment of the invention, an eye can be clicked on a maximum of five times and the intensity may be adjusted linearly from the starting point to the minimum or maximum intensity with each subsequent click. Accordingly, when the intensity starts with zero, each subsequent click may increment the intensity by approximately twenty to twenty five percent. Alternatively, each click may decrement the intensity by to a minimum intensity. In an embodiment of the invention the start intensity may be detected automatically based on metadata associated with the digital image.

In an alternate embodiment of the invention, the click requests may automatically adjust the pupil size detected by the image processing engine. Here, the image engine detects the location of the pupil in the selected red-eye region and decreases the size of the pupil based on the size of the red area in the selected region.

Figure 5:
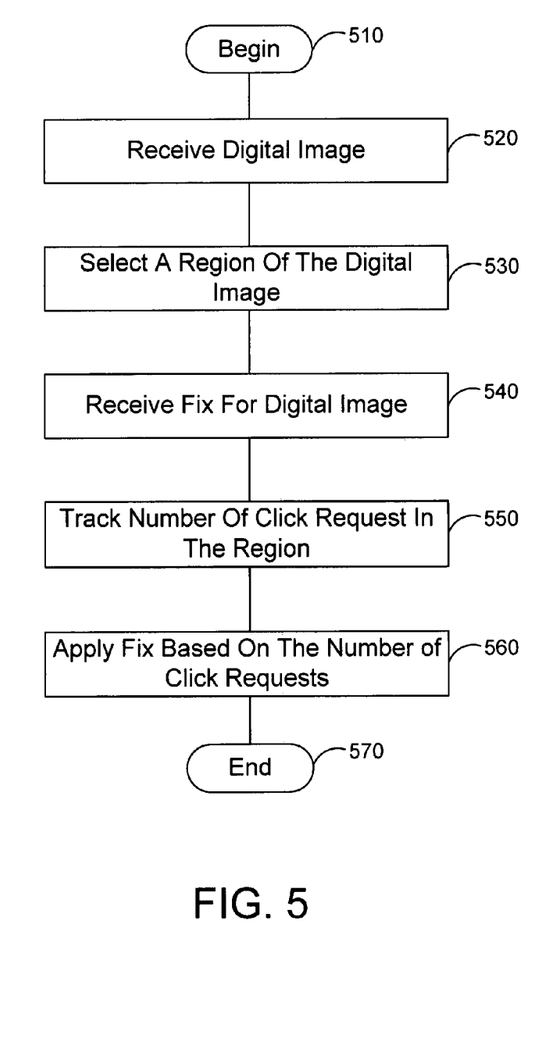
FIG. 5 illustrates a method to apply variable image effects to digital images according to an embodiment of the invention.

FIG. 5 illustrates a method to apply variable image effects to digital images according to an embodiment of the invention. The method begins in step 510. A digital image is received from a multimedia database in step 520. The user selects a region, such as a red-eye region, in the digital image in step 530. The image processing engine receives a request to apply an image effect, such as a red-eye fix, and calculates the coordinate, size, and intensity information associated with the image effect in step 540. The number of clicks associated with the selected region is tracked and stored in the image-effect, red-eye, data structure in step 550. The intensity of a image effect is calculated and applied to the selected region based on the number clicks associated with the selected region in step 560. The method ends in step 570.

The intensity of the image effect is based on the number of times the users click on or near a region in the digital image. The user can click one to five times on any region, such as a red-eye region, and the image effect, correction is adjusted with each click. On the sixth click the no further adjustment to the correction is allowed. In an embodiment of the invention, the user may remove the red-eye on a first click on the digital image. The adjustments may increase or decrease the correction. In an embodiment of the invention, the adjustments may vary different region characteristics inversely. For instance, the radius of the area requiring correction may decrease as the intensity of the red-eye fix increases. Furthermore, a fix may automatically increase and decrease brightness and color characteristics, respectively. Accordingly, the image processing engine may automatically adjust specified characteristics inversely based on the click requests received from the user.

In an alternate embodiment of the invention, the image processing engine may be utilized for any operation that is a variable operation, which should be applied to a location within the image based on the number of user clicks near the location. For instance, a user can click on a tree to apply an operation to make the tree greener. The image processing engine detects the boundaries of the tree and varies the intensity of green applied to the tree and generates a greener tree. Subsequent clicks on the tree increases the intensity of the green applied to the tree. Accordingly, increasing levels of the operation may be applied to an object having boundaries included within a digital image. The level of the operation applied within the boundaries of the object in the digital image is varied based on the number of clicks on the object. The operation is applied locally to the object within the image and not globally to the entire image. The intensity of the operation may be increased or decreased based on the operation being implemented.

In sum, an image processing engine removes red-eye effect from digital images having one or more red-eye regions. A red-eye fix applied to the red-eye regions reduces or removes red areas included in the red-eye region. The intensity of the fix applied to red-eye regions is varied depending on the number of clicks received by the image processing engine.

In an alternate embodiment of the invention, a red-eye data structure tracks the locations and the amount of effect applied to each region of the digital image having a red-eye effect. The red-eye data structure includes properties that identify each red-eye region, the number of clicks, the effect being applied and the current level of the effect. The image processing engine utilizes the red-eye data structure to effectively apply the selected effect on the red-eye region.

The foregoing descriptions of the invention are illustrative, and modifications in configuration and implementation will occur to persons skilled in the art. For instance, while the invention has generally been described with relation to FIGS. 1-5, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A method to apply a red-eye fix to a region in an object having one or more regions, the method comprising:
   selecting, using a computer, the object having one or more regions;
   generating, using a computer, a request specifying a region of the one or more regions to apply the red-eye fix; and
   applying, using a computer, the red-eye fix based on a number of click requests for the region of the one or more regions, wherein an intensity of the red-eye fix varies with the number of requests.

2. The method according to claim 1, wherein a red-eye fix threshold is reached after a predetermined number of requests.

3. The method according to claim 1, wherein the red-eye fix is adjusted linearly with each subsequent request.

4. The method according to claim 1, wherein applying the red-eye fix based on a number of click requests, further comprises:
   tracking a location associated with the region.

5. The method according to claim 1, wherein the red-eye fix is applied in a non-uniform manner in different regions of the object.

6. The method according to claim 1, wherein the red-eye fix adjusts the color associated with the region of the one or more regions in the object.

7. A method to apply a red-eye fix to an image, the method comprising:
   selecting, using a computer, an image having a plurality of red-eye regions;
   identifying, using a computer, one or more pairs of red-eye regions in the image;
   clicking on a region near the one or more pairs of red-eye regions; and
   applying, using a computer, a predetermined level of the red-eye fix to remove the one or more pairs of red-eye regions from the image.

8. The method according to claim 7, wherein the predetermined level of the red-eye fix is applied uniformly across the one or more pairs of red eye regions.

9. The method according to claim 7, wherein the predetermined level of the red-eye fix is applied non-uniformly across the one or more pairs of red eye regions.

10. The method according to claim 7, wherein applying a predetermined level of the red-eye fix to remove the one or more pairs of red-eye regions, further comprises:

tracking the one or more pairs of red-eye regions to detect a change in amount of red-eye fix associated with one red-eye region of a pair of red-eye regions; and applying a similar amount of the red-eye fix to the corresponding red-eye region of the pair.

11. The method according to claim 10, wherein multiple pairs of red-eye regions in proximity to the region receives the predetermined level of fix.

12. A computer readable medium having a memory storing instructions that are executable by a processor to perform the method as recited in claim 7.

13. A graphical user interface communicatively connected to an image processing engine that removes red-eye from multimedia files, the graphical user interface comprising:

a control section having a variable fix control that removes red-eye from a selected region of a multimedia file based on a number of clicks received from a user, wherein subsequent clicks less than a specified number of clicks incrementally increases the intensity of the variable fix applied to the selected region of the multimedia file;

a display section to display the multimedia file; and a details section to provide information associated with the variable fix control that removes red-eye.

14. The graphical user interface according to claim 13, wherein the variable fix control communicates location information to the image processing engine.

15. The graphical user interface according to claim 14, wherein the display section includes a cursor that selects a region of the multimedia file having red-eye.

16. The graphical user interface according to claim 15, wherein the image processing engine receives the region selected by the cursor and processes the region to remove the red-eye.

17. The graphical user interface according to claim 16, wherein the image processing engine removes the red-eye before the number of subsequent clicks exceeds the specified number of clicks.

18. The graphical user interface according to claim 16, wherein the image processing engine removes the red-eye by adjusting at least one of color or exposure.

19. A computer system including a display device to display the graphical user interface as recited in claim 13.

* * * * *

UNITED STATES PATENT AND TRADEMARK OFFICE
CERTIFICATE OF CORRECTION

PATENT NO. : 7,620,215 B2 Page 1 of 1
APPLICATION NO. : 11/226276
DATED : November 17, 2009
INVENTOR(S) : Parlin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Twenty-sixth Day of October, 2010

David J. Kappos
*Director of the United States Patent and Trademark Office*